United States Patent [19]
Hashimoto

[11] Patent Number: 4,609,783
[45] Date of Patent: Sep. 2, 1986

[54] AUTOMATIC TELEPHONE ANSWERING APPARATUS

[75] Inventor: Kazuo Hashimoto, Tokyo, Japan

[73] Assignee: Hashimoto Corporation, Tokyo, Japan

[21] Appl. No.: 684,916

[22] Filed: Dec. 21, 1984

[30] Foreign Application Priority Data

Dec. 24, 1983 [JP] Japan .................. 58-251686

[51] Int. Cl.$^4$ ............................................ H04M 1/65
[52] U.S. Cl. .................. 179/84 A; 179/6.13; 179/6.16
[58] Field of Search ............ 179/81 R, 84 A, 84 R, 179/6.02, 6.03, 6.12, 6.13, 6.16, 6.19, 5 R, 5 P, 2 A, 2 AM

[56] References Cited

U.S. PATENT DOCUMENTS 2,658,107 11/1953 Zimmermann ............ 179/6.16 X
3,548,102 12/1970 Schaum et al. ............ 179/6.16 X

*Primary Examiner*—James L. Dwyer
*Attorney, Agent, or Firm*—Lowe Price LeBlanc Becker & Shur

[57] ABSTRACT

In an automatic telephone answering apparatus, a ringing tone generated upon reception of an incoming call is detected by a ringing tone detecting means, a pulse or leakage flux generated upon reception of the incoming call is detected by a pulse detecting means, and a telephone line is engaged when the ringing tone detecting means and said pulse detecting means simultaneously generate detection signals, thereby operating the automatic telephone answering apparatus.

5 Claims, 2 Drawing Figures

AUTOMATIC TELEPHONE ANSWERING APPARATUS

BACKGROUND OF THE INVENTION

1. Field of the Invention

The present invention relates to an automatic telephone answering apparatus for automatically receiving an incoming call, sending an outgoing message and recording a message of a calling party.

2. Description of the Prior Art

Conventional automatic telephone answering apparatuses are classified into an apparatus of a type (to be referred to as a direct type hereinafter) which is directly connected to a telephone line and an apparatus of a type (to be referred to as an indirect type hereinafter) which is not directly connected to the telephone line. Indirect type automatic telephone answering apparatuses have been commercially available due to a relationship with a telephone system at the very beginning of development. For example, a typical indirect type automatic telephone answering apparatus was earlier developed by the same inventor and published as U.S. Pat. No. 3,376,390. In such direct and indirect type automatic telephone answering apparatus, upon reception of an incoming call, a pulse or leakage flux generated by calling signal shall be detected. The detection signal is amplified, and an amplified signal energizes a relay to make a loop circuit of a telephone line. Recent commercially available telephone sets have a construction to decrease a pulse or flux. For this reason, the sensitivity of an amplifier in a pulse or flux detection system must be increased. However, when the amplifier sensitivity is increased, a pulse or flux from a power source of an electrical device such as as a fluorescent lamp, a vacuum cleaner, or an electric shaver is picked up by the amplifier which is then erroneously operated. In addition, the amplifier is erroneously operated by a pulse from a power line thereof when the automatic telephone answering apparatus is reset to the standby mode, thereby repeating erroneous operations.

It is considerably difficult to establish correspondence between the pulse or leakage flux detecting systems used by each type of telephone set. For this reason, the ringing tone is often picked up and detected to start the automatic telephone answering apparatus. However, in the answering apparatus wherein the tone is detected, the detecting system is erroneously started by a tone similar to the ringing tone. Such a tone includes a high pitched voice, a vehicle siren tone, or other ringing tone from an adjacent telephone set, thus degrading reliability of the automatic telephone answering apparatus.

SUMMARY OF THE INVENTION

It is, therefore, a first object of the present invention to eliminate the drawbacks of the conventional direct and indirect type automatic telephone answering apparatus, and to provide both automatic telephone answering apparatus which are properly operated in response to reception of an incoming call only.

It is a second object of the present invention to provide an automatic telephone answering apparatus having an input detector for detecting inputs of both a pulse generated from a telephone set or a telephone line and a ringing tone or a buzzer tone generated upon reception of an incoming call so as to enable the apparatus to operate in response to only both the inputs.

In order to achieve the above objects of the present invention, there is provided an automatic telephone apparatus comprising: a microphone for detecting an actual ringing tone when an incoming call is received; ringing tone detecting means including an amplifier and a rectifying/smoothing circuit; pulse or leakage flux detecting means, including an inductive coil, an amplifier and a rectifying/smoothing circuit, for detecting a pulse or flux generated from telephone set; and means for supplying outputs from the ringing tone detecting means and the pulse or flux detecting means to an AND gate, thereby operating the automatic telephone answering apparatus. In addition, in order to adjust the detection level of the ringing tone and the pulse or flux, the gains of the amplifiers can be adjusted in accordance with the detection level.

In the automatic telephone answering apparatus according to the present invention, the apparatus is started only when the ringing tone is generated and the pulse or flux is present. Unlike the conventional automatic telephone answering apparatus, the apparatus of the present invention will not be erroneously started in response to tones excluding the tones described above. Furthermore, the automatic telephone answering apparatus will not be erroneously operated in response to a pulse or flux component generated from other electric equipment.

DETAILED DESCRIPTION OF THE PREFERRED EMBODIMENTS

Figure 1:
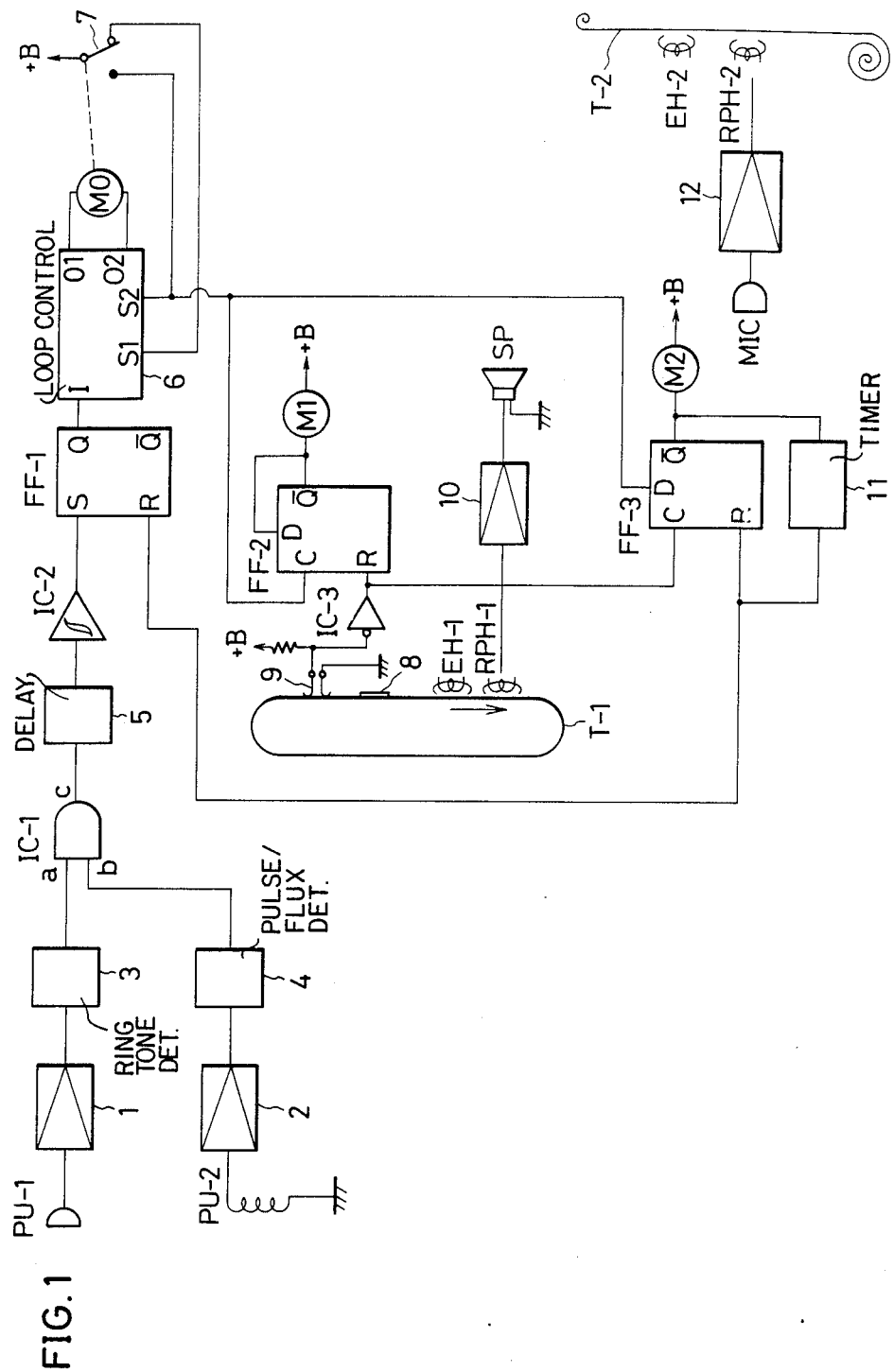
FIG. 1 is a circuit diagram showing the main part of the automatic telephone answering apparatus according to a first embodiment of the present invention.

The present invention will be described in detail with reference to the accompanying drawings. FIG. 1 shows an automatic telephone apparatus according to an embodiment of the present invention. Reference symbol PU-1 denotes a microphone for picking up a ringing tone when a telephone set (not shown) receives an incoming call; and PU-2, an inductive coil for picking up a pulse or flux when the telephone set receives the incoming call. The inductive coil PU-2 may be constituted by a secondary coil of a line transformer in the telephone set. Reference numerals 1 and 2 denote amplifiers, respectively; and 3 and 4, rectifying/smoothing circuits. The microphone PU-1, the amplifier 1 and the rectifying/smoothing circuit 3 constitute a ringing tone detecting means. The inductive coil PU-2, the amplifier 2 and the rectifying/smoothing circuit 4 constitute a pulse or flux detector. Reference symbol IC-1 denotes an AND gate. Reference numeral 5 denotes a delay circuit for generating a signal of high level when a bell rings several times. Reference symbol IC-2 denotes a Schmitt trigger circuit; and FF-1, an RS flip-flop which is set in response to an output from the Schmitt trigger circuit IC-2. Reference numeral 6 denotes a loop control circuit for starting a motor or relay M0 in response to an output from the flip-flop FF-1. When an input terminal I is set at high level, the motor or relay M0 as a load is operated. A handset (not shown) is lifted or a hook switch (not shown) is released and is turned on to establish a loop circuit of a telephone line. A contact 7 is switched upon the ON operation of the motor or relay M0. When the contact 7 is switched to set a terminal S2 of the loop control circuit 6 to high level, the motor M0 is stopped. Reference numeral T-1 denotes an outgoing message tape which has an outgoing message; 8, a mark attached to the start point of the outgoing message tape T-1; and 9, a mark detecting means. Reference symbol EH-1 denotes an erase head; and RPH-1, a record/play head. Reference symbol FF-2 denotes a D flip-flop which is set when the contact 7 is set in a make position. In this state, the D flip-flop FF-2 energizes a motor M1 for driving the outgoing message tape T-1. When the outgoing message tape T-1 has reached its start point again, the D flip-flop FF-2 is reset. Reference numeral 10 denotes an amplifier for the outgoing message tape T-1. Reference symbol SP denotes a speaker or equivalent coil for sending the outgoing message amplified by the amplifier 10 onto the telephone line. Reference symbol FF-3 denotes a D flip-flop which is set when the outgoing message tape T-1 travels and has reached its start point again. The D flip-flop FF-3 is reset by a timer 11. Reference symbol M2 denotes a motor for an incoming message tape T-2. The motor M2 is controlled in response to an output from the flip-flop FF-3.

It should be noted that the outgoing and incoming message tapes T-1 and T-2 may be replaced with a single multichannel tape as described in Japanese Patent Publication No. 52-30204. In this case, only one motor is used. However, this arrangement is not directly associated with the present invention, and a description thereof will be omitted. Reference symbol MIC denotes a microphone or equivalent transducer, which is acoustically coupled to the input terminal of the handset or is inductively coupled so as to pick up a message of a calling party. Reference numeral 12 denotes an amplifier, and reference symbol RPH-2 denotes a record/play head.

The operation of the automatic telephone answering apparatus having the above arrangement will be described hereinafter. When a ringing signal is received from a calling party to a telephone set (not shown) connected to the automatic telephone answering apparatus, a ringing or buzzer tone and a pulse (flux) are generated from the telephone set. The ringing tone is detected by the microphone PU-1 and is amplified by the amplifier 1. The amplified ringing signal is rectified by the rectifying/smoothing circuit 3. A terminal a of the AND gate IC-1 is kept high while the ringing tone is being generated. Meanwhile, when the pulse or flux is detected by the inductive coil PU-2, the pulse is amplified by the amplifier 2 and is rectified by the rectifying/smoothing circuit 4. A terminal b of the AND gate IC-1 is kept high while the ringing tone is being generated. Therefore, a terminal c of the AND gate IC-1 goes high due to logically ANDed inputs. When the ringing tone is generated several times and detected by the delay circuit 5, the flip-flop FF-1 is set through the Schmitt trigger circuit IC-2. When an output terminal Q of the flip-flop FF-1 goes high, the loop control circuit 6 is started, as previously described. The motor or relay M0 as a load is operated. Furthermore, when the contact 7 is set in the make position, a terminal C of the flip-flop FF-2 goes high to set the flip-flop FF-1. The motor M1 is started to drive the outgoing message tape T-1 in the direction indicated by an arrow in FIG. 1. A prerecorded outgoing message is reproduced by the record/play head RPH-1, and a reproduced signal is amplified by the amplifier 10. An amplified signal is sent to the telephone line through the speaker or equivalent inductive coil SP.

When the outgoing message tape has reached its start point again and the tab 8 is brought into contact with the electrode 9, the flip-flop FF-2 is reset through an inverter IC-3. The outgoing message tape T-1 is stopped by the motor M1 to set the flip-flop FF-3, thereby driving the motor M2 and the timer 11. The incoming message tape T-2 is driven to pick up a message of the calling party, so that the message is recorded on the incoming message tape T-2. When a predetermined period of recording time has elapsed and the timer 11 generates a time-up signal, the flip-flops FF-3 and FF-1 are set. When the flip-flop FF-3 is reset to stop the incoming message tape T-2, and the input terminal I of the loop control circuit 6 goes low in response to resetting of the flip-flop FF-1, the automatic telephone answering apparatus is set in the standby mode.

Figure 2:
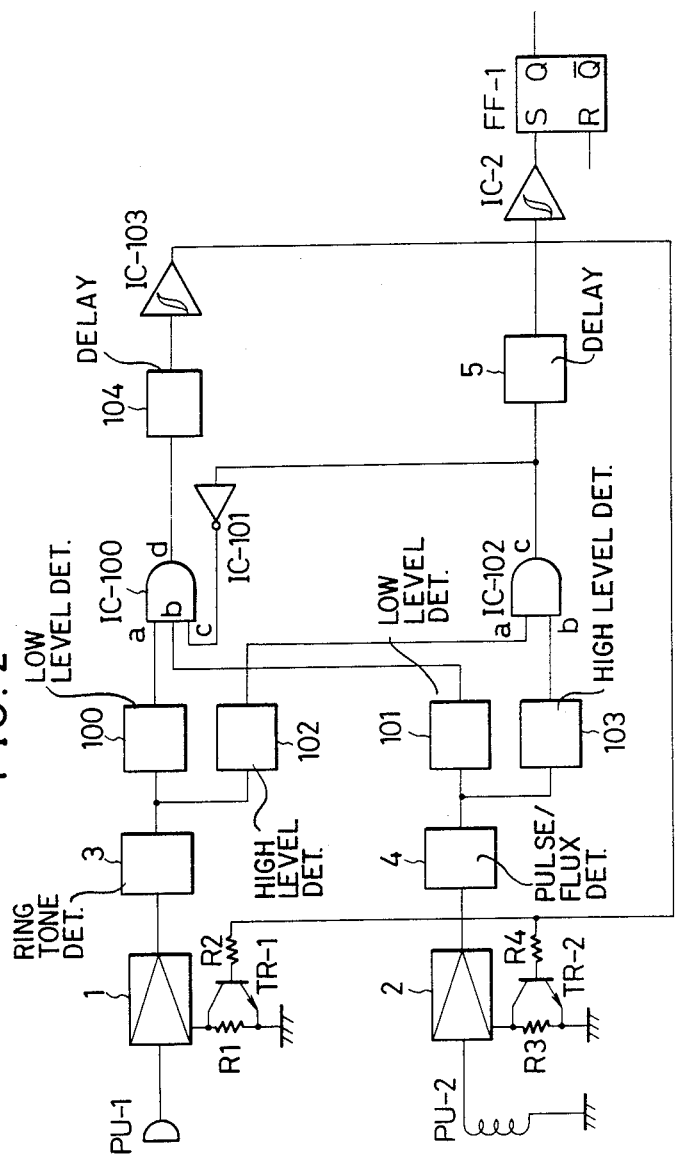
FIG. 2 is a circuit diagram showing the main part of the automatic telephone answering apparatus according to a second embodiment of the present invention.

FIG. 2 is a circuit diagram of an automatic telephone answering apparatus according to a second embodiment of the present invention. Only circuit arrangements of the apparatus (FIG. 2) which differ from those of the apparatus (FIG. 1) will be described. Amplifiers 1 and 2 are supplied with a feedback current through resistors R1 and R3. The amplifiers 1 and 2 in, for example, a 600 series telephone set have a proper gain with respect to the ringing tone and the pulse or flux and thus will not be erroneously operated in response to external noise or the like. By short-circuiting the resistors R1 and R3 by means of transistors TR-1 and TR-2, the gain of the amplifiers 1 and 2 can be increased by about 10 times. Therefore, the amplifiers in the apparatus can be easily adapted for a pushphone set or a digital telephone set wherein a ringing tone level is low and a small pulse or light in place of a flux. Reference numerals 100 and 101 denote low-level signal detectors, respectively. The low-level signal detectors 100 and 101 comprise converters and generate high level signals in response to low level input signals, respectively. Reference numerals 102 and 103 denote high-level signal detectors, respectively. The high-level signal detectors 102 and 103 comprise converters and generate high-level signals in response to high level input signals, respectively. Reference symbols IC-100 and IC-102 denote AND gates, respectively. Reference numeral 104 denotes a delay circuit for generating a signal of high level when a short period of time of about 0.2 seconds has elapsed after the delay circuit 104 receives the input signal. The delay circuit 104 keeps generating the signal of high level for about one second even after the input signal is stopped. The AND gate IC-100, the delay circuit 104, a Schmitt trigger circuit IC-103 and the transistors TR-1 and TR-2 constitute a gain switching means.

The operation of the automatic telephone answering apparatus having the arrangement described above and shown in FIG. 2 will be described hereinafter. When an incoming call is received from a third party and the bell of a telephone set (not shown) rings, the ringing tone and the pulse are picked up by a microphone PU-1 and an inductive coil PU-2, respectively, in the same manner as in the first embodiment. Picked up signals are amplified by the amplifiers 1 and 2 and are supplied to the low- and high-level signal detectors 100 and 102 through rectifying/smoothing circuits 3 and 4. A pulse detection signal is supplied to the low- and high-level signal detectors 101 and 103. When one or both the input signals are set at low level, outputs from the low-level signal detectors 100 and 101 go high, so that terminals a and b of the AND gate IC-100 go high. On the other hand, the terminal c of the AND gate IC-100 is kept high unless outputs from the high-level signal detectors 102 and 103 are both set at high level. This is because an output from the AND gate IC-102 is set at low level when at least one of the outputs from the high-level signal detectors 102 and 103 is set at low level, thereby setting the terminal c of the AND gate IC-100 at high level through an inverter IC-101. An output terminal d of the AND gate IC-100 thus goes high. The transistors TR-1 and TR-2 are turned on through the 0.2-second delay circuit 104 and the Schmitt trigger circuit IC-103, thereby increasing the gains of the amplifiers 1 and 2. When the ringing tone and the pulse are detected again, the outputs from the high-level signal detectors 102 and 103 go high to set the input terminals a and b of the AND gate IC-102 at high level and the output terminal c at high level. The flip-flop FF-1 is set through the delay circuit 5 and the Schmitt trigger circuit IC-2, as shown in FIG. 2. The automatic telephone answering apparatus of the second embodiment is operated in the manner described with reference to FIG. 1.

However, when the high-level ringing tone and the high-level ringing pulse or flux are obtained at the beginning of reception of an incoming call, the outputs from the high-level signal detectors 102 and 103 are set at high level. In this case, the output terminal c of the AND gate IC-102 goes high. An input to the delay circuit 104 through the inverter IC-101 and the AND gate IC-100 is stopped, and the transistors TR-1 and TR-2 are not turned on. Therefore, the gain of the amplifiers 1 and 2 is not increased. The flip-flop FF-1 is set through the delay circuit 5 and the Schmitt trigger circuit IC-2, thereby operating the automatic telephone answering apparatus in a prescribed manner.

What is claimed is:

1. An automatic telephone answering apparatus comprising: ringing tone detecting means for detecting a ringing tone when an incoming call is received; pulse detecting means for detecting a pulse or flux generated upon the incoming call; an AND gate for receiving outputs from said ringing tone detecting means and said pulse detecting means; and means for establishing a loop circuit of a telephone line in response to an output from said AND gate.

2. An apparatus according to claim 1, wherein low- and high-level signal detectors are arranged in each of said ringing tone detecting means and said flux detecting means to detect output levels of said ringing tone detecting means and said flux detecting means, a detection signal is supplied to said AND gate through each of said high-level signal detectors, and gain switching means is arranged to increase gains of said ringing tone detecting means and said flux detecting means only when said low-level signal detectors generate outputs and said AND gate does not generate an output.

3. An apparatus according to claim 1, including ringing tone generating means which comprises a bell or buzzer, and wherein said pulse detecting means detects a pulse or flux from said bell or buzzer upon an operation thereof.

4. An apparatus according to claim 1, wherein said establishing means engages the loop circuit by lifting up a handset in response to an output from said AND gate.

5. An apparatus according to claim 1, wherein said establishing means comprises a hook switch actuating or equivalent engaging circuit operated in response to an output from said AND gate.

* * * * *